3,110,727
METHOD OF PRODUCING METHYLPHOSPHONIC ACID AND DERIVATIVES
Arthur Dock Fon Toy, Park Forest, and Eugene H. Uhing, Chicago, Ill., assignors to Stauffer Chemical Company, New York, N.Y., a corporation of Delaware
No Drawing. Filed Oct. 26, 1960, Ser. No. 65,017
3 Claims. (Cl. 260—500)

This invention relates to a new method of producing methylphosphonic acid, and intermediate hydrolysis reaction products resulting from the hydrolysis of chloromethylphosphonous chloride and chloromethylphosphinic acid in strongly alkaline aqueous solutions.

The present invention is particularly concerned with the hydrolysis of chloromethylphosphinic acid in strong caustic soda aqueous solutions in amounts sufficient to maintain the alkalinity of the reaction mixture at a pH value of at least about 11.0, and the further conversion of the principal hydrolysis product to methylphosphonic acid and other derivatives.

Methylphosphonic acid and derivatives such as the methylphosphonyl halides are well known compounds useful as intermediates for the proudction of a number of organic phosphorus compounds such as the esters, free acids and amides, having utility as fungicides, insecticides, surface active agents, petroleum additives, etc.

Previous methods for the production of methylphosphonyl chloride and methylphosphonic acid were rather complex and not entirely satisfactory. One method involves the initial formation of a $CH_3Cl.PCl_3.AlCl_3$ complex and the subsequent controlled hydrolysis of such complex in a methylene chloride solvent followed by separation of the hydrated aluminum chloride then distillation to remove hydrochloric acid and the methylene chloride solvent, and further fractionation of the organic residual mixture to separate and recover the methylphosphonyl chloride. Another method involves the treatment of the $CH_3Cl.PCl_3.AlCl_3$ complex with hydrofluoric acid to produce a methanephosphorus tetrafluoride which is subsequently hydrolyzed to methylphosphonic acid, or oxidized to methylphosphonyl fluoride with sulfur dioxide.

The method of the present invention eliminates the necessity of using aluminum chloride, and the process complexities inherent in such use, and further permits the use of simpler processing equipment because of the less corrosive nature of the reactants involved.

We have found that chloromethylphosphonous chloride, as well as chloromethylphosphinic acid or its sodium salt, may be hydrolyzed with an aqueous solution of sodium hydroxide to give, unexpectedly, good yields of the sodium salts of methylphosphonic acid.

Hydrolysis of chloromethylphosphonous chloride in an excess of a strong sodium hydroxide solution at temperatures of 50°–120° C. yields essentially a mixture of methylphosphonates and hydroxymethylphosphinates together with minor amounts of complex side reaction products. The proportion of the major hydrolysis product, methylphosphonates, formed is controlled by the amount and concentration of the sodium hydroxide solution employed.

The hydrolysis reaction appears to take place in a stepwise manner in accordance with the following equations:

(I) 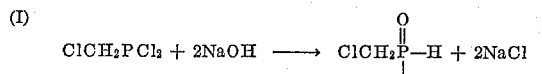

(II) 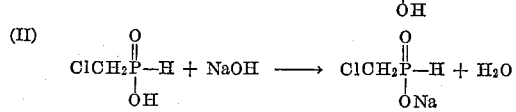

(III) 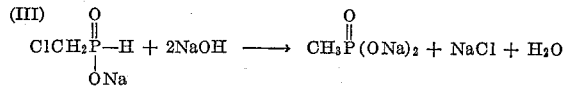

The overall reaction as represented by the summation of the above reactions is shown by the equation:

(IV) 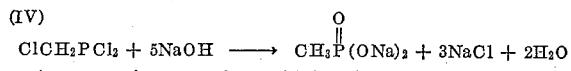

A competing reaction which takes place to some extent may be represented by the equation:

(V) 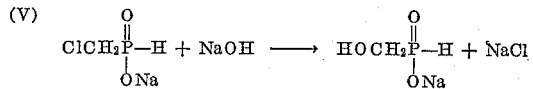

The reaction of Equation V represents the normal and expected reaction. However, we have unexpectedly found that when an excess of sodium hydroxide is employed in the hydrolysis procedure the reaction proceeds essentially in accordance with Equations III and IV to produce a mixture containing at least 80% of the desired sodium salt of methylphosphonic acid and less than 20% of the sodium salt of hydroxymethylphosphinic acid.

An improvement in the hydrolysis procedure may be effected by using as the starting material the chloromethylphosphinic acid and following the reactions of Equations II and III. The chloromethylphosphinic acid starting material may be efficiently prepared by the aqueous or acidic hydrolysis of chloromethylphosphonous chloride in accordance with equation:

(VI) 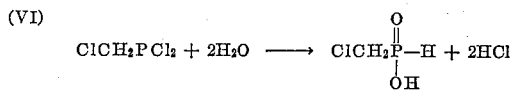

The chloromethylphosphinic acid may be prepared in substantially pure form by this procedure with the recovery of a useful hydrochloric acid by-product. This procedure is described and claimed in the copending application of A. D. F. Toy and K. H. Rattenbury (U.S. Serial No. 65,018, filed October 26, 1960).

Whether or not the hydrolysis procedure of the present invention is carried out in accordance with Equation IV or Equation III, essentially the same mixture of hydrolysis products is obtained.

By varying the amount of caustic soda employed, its concentration and the temperature of the hydrolysis reaction, the ratio of the methylphosphonate to the hydroxymethylphosphinate produced may be varied over a wide range. For example, when using a dilute solution of caustic soda (0.25 N) while maintaining a pH of about 11.6, the hydrolysis, at 90° C., of sodium chloromethylphosphinate was incomplete after 30 hours. About half of the sodium chloromethylphosphinate was hydrolyzed giving a product having a ratio of methylphosphonate to hydroxymethylphosphinate of about 2:1. On the other hand, when using an excess of a concentrated sodium hydroxide solution at a pH above 11.6 and a temperature of about 100° C., the hydrolysis reaction was completed within a few hours giving a product containing at least 80% of the sodium methylphosphonate component with less than 20% of the hydroxymethylphosphinate.

In order to obtain a substantially pure methylphosphonic acid the above hydrolysis reaction mixture is neutralized with hydrochloric acid, dried and then extracted with ethyl alcohol and the alcoholic extract dried by evaporating off the alcohol. The residue is then chlorinated with $SOCl_2$ or $PCl_5$ to produce a mixture of

and other acid chlorides. This mixture is then fractionated to separate and recover the methylphosphonyl chloride which is then hydrolyzed with water to produce the desired methylphosphonic acid in substantially pure form.

*Example I*

Eighty grams (2 moles) of sodium hydroxide dissolved in 150 cc. of water was heated to 100° C. To this solution was added slowly with stirring, a solution of 136.5 grams (1 mole) sodium chloromethylphosphinate in 100 cc. of water. The reaction system was maintained in an inert atmosphere of nitrogen. The reaction was exothermic and required very little external heating to maintain the temperature of the reaction mixture at 100° C. during the addition of the sodium chloromethylphosphinate. After the addition was completed in about two hours the mixture was maintained at 100° C. for approximately three hours to complete the hydrolysis step with the formation of the sodium salts of methylphosphonic and hydroxymethylphosphinic acids and minor amounts of other hydrolysis products. The crude reaction mixture was then cooled and acidified with an excess of concentrated hydrochloric acid and evaporated to dryness under reduced pressure and then extracted with a total of one liter of ethyl alcohol. The alcoholic extract was then evaporated down under vacuum to remove the alcohol and yielded 94.2 grams of a viscous liquid residue. Analysis of the residue showed it to be substantially a mixture of 81.4% methylphosphonic acid and 18.6% hydroxymethylphosphinic acid.

In order to separate and recover the methylphosphonic acid from the above reaction mixture, the mixture of acids may be chlorinated, with $SOCl_2$ or $PCl_5$, to form a mixture of the acid chlorides which may be readily separated by fractional distillation. The separated methylphosphonyl chloride fraction, if desired, may then be hydrolyzed with water to yield a substantially pure methylphosphonic acid product, as illustrated in the following example.

*Example II*

To 72.4 grams of the above mixture of acids (from Example I) was slowly added with stirring, 236 grams of thionyl chloride while maintaining a temperature of 20°–30° C. Voluminous evolution of HCl took place. The residual reaction mixture of acid chlorides was then fractionated under reduced pressure. The fraction boiling at 63°–87° C. at 55 mm. Hg pressure was collected and refractionated with the fraction boiling at 100°–110° C. at 100 mm. Hg being collected. This fraction weighed 76.1 grams (93.8% yield) and was substantially pure methylphosphonyl chloride. Analysis showed 23.0% P and 53.6% Cl (theory for $CH_3POCl_2$ is 23.3% P and 53.4% Cl).

The methylphosphonyl chloride thus obtained was hydrolyzed with water in an exothermic reaction to produce methylphosphonic acid with liberation of HCl as a by-product. The aqueous hydrolyzate upon evaporation to dryness yielded a substantially pure methylphosphonic acid of the formula

having a melting point of 103°–104° C., a phosphorus content of 32.3% and a molecular weight of 96 which correspond to the theoretical values for the compound.

*Example III*

In a 3-neck flask with stirrer and reflux condenser was placed 145 grams (1.27 moles) of chloromethylphosphinic acid, and 400 ml. of water containing 4 moles of NaOH was added while holding the temperature at below 10° C. The mixture was then warmed to 60° C. when an exothermic reaction started. With cooling the temperature was held at about 75° C. until the exothermic action subsided. An additional 0.2 mole of NaOH was then introduced and the reaction mixture heated at 100° C. for one hour. 99.3% of the chlorine of the chloromethyl group had been ionized at this stage. The mixture was treated with 3.4 moles of HCl (15% excess) and then evaporated to dryness under reduced pressure and extracted with ethanol to separate the product from the sodium chloride residue. The ethanol extract was evaporated under reduced pressure and the product dried at 100° C. under high vacuum. The crude product weighed 119.5 grams (98% yield). The product was a mixture containing about 90% methylphosphonic acid and about 8% hydroxymethylphosphinic acid. If desired, this crude methylphosphonic acid may be purified in accordance with the procedure of Example II.

*Example IV*

One mole of the sodium salt of chloromethylphosphinic acid was added dropwise to a mixture of 100 grams NaOH and 150 ml. of water maintained at 105°–115° C. over a period of two hours and further heated at the reaction temperature for an additional three hours. The reaction mixture was cooled and acidified with an excess of concentrated HCl, and then evaporated to dryness and extracted with ethanol to separate the product from the formed sodium chloride. After evaporating off the ethanol a 100% yield of crude methylphosphonic acid containing 11.6% hydroxymethylphosphinic acid was obtained.

*Example V*

The above crude methylphosphonic acid was used to prepare substantially pure methylphosphonyl chloride in the following manner:

In a three neck reaction flask equipped with stirrer, dropping funnel and ice water cooled reflux condenser there was placed 72.4 grams of the above crude methylphosphonic acid. Then 236 grams of $SOCl_2$ (2.67 mole equivalents) was added dropwise at a temperature of 30° C. After completion of the addition the product was distilled and the fraction coming over at 63°–87° C. (120 mm.) was collected. The fraction was redistilled and 76.1 grams (76.5% yield) of substantially pure methylphosphonyl chloride was collected at 107°–112° C. at 100 mm. Hg pressure. The product was a solid at room temperature. The methylphosphonyl chloride thus produced may be readily employed in known manner to produce alkyl and aryl esters of methylphosphonic acid, or, if desired, it may be hydrolyzed in water or aqueous acidic solutions to produce a substantially pure methylphosphonic acid.

*Example VI*

One mole of sodium chloromethylphosphinate was slowly added to a hot refluxing aqueous solution of 4 moles of sodium hydroxide. After 4 hours the reaction mixture was acidified with hydrochloric acid and evaporated to dryness, and then extracted with concentrated HCl giving a 96.5% yield of methylphosphonic acid containing 12% of hydroxymethylphosphinic acid.

In all the above discussion and examples, it is possible to use other alkali metal hydroxides such as potassium hydroxide in place of the sodium hydroxide. The reactions proceed with equal case and equivalent yields result.

The above description of the invention is intended to be illustrative and no unnecessary limitations are implied except as are defined in the appended claims.

We claim:

1. A process for producing the sodium salts of methylphosphonic acid which comprises hydrolyzing chloromethylphosphinic acid with an aqueous solution of at least two mole equivalents of sodium hydroxide at a temperature of about 90°–120° C. while maintaining the pH value of reaction mixture at least 11.0.

2. A process for producing methylphosphonic acid which comprises hydrolyzing chloromethylphosphinic acid with an aqueous solution of at least 2 mole equivalents of sodium hydroxide at a temperature of about 60° to 120° C. while maintaining the pH value of the reaction mixture at least 11.0, and acidifying the reaction product to form methylphosphonic acid.

3. A process in accordance with claim 2 wherein the temperature is maintained within the range of about 90° to 120° C.

References Cited in the file of this patent

Hofmann: "Berichte der Deutschen Chemischen Gesellschaft," volume 6, pages 30–38 (1873).